United States Patent [19]

Schaule et al.

[11] Patent Number: 5,448,120
[45] Date of Patent: Sep. 5, 1995

[54] INTEGRATED HYDRODYNAMIC BEARING/MOTOR ASSEMBLY

[75] Inventors: Max Schaule, Mindelheim; Roy MacKinnon, Frankenried, both of Germany

[73] Assignee: Quantum Corp., Milpitas, Calif.

[21] Appl. No.: 209,691

[22] Filed: Mar. 10, 1994

Related U.S. Application Data

[63] Continuation of Ser. No. 976,238, Nov. 13, 1992, abandoned.

[30] Foreign Application Priority Data

Nov. 14, 1991 [EP] European Pat. Off. ......... 91119472

[51] Int. Cl.[6] .................... H02K 7/08; H02K 7/14; F16C 32/06; G11B 17/08
[52] U.S. Cl. .................... 310/90; 310/67 R; 360/98.07; 384/110
[58] Field of Search ............ 310/67 R, 90, 90.5; 360/98.07, 99.04, 99.08; 384/100, 110, 113

[56] References Cited

U.S. PATENT DOCUMENTS

| | | | |
|---|---|---|---|
| 3,851,933 | 12/1974 | Jacobson | 384/113 |
| 4,712,031 | 12/1987 | Anderson | 310/90 |
| 4,717,977 | 1/1988 | Brown | 360/98.07 |
| 4,795,275 | 1/1989 | Titcomb et al. | 384/107 |
| 4,828,403 | 5/1989 | Schwartzman | 384/110 |
| 4,919,547 | 4/1990 | Schwartzman | 384/110 |
| 4,998,033 | 3/1991 | Hisabe et al. | 310/90 |
| 5,001,581 | 3/1991 | Elsasser et al. | 360/99.08 |
| 5,019,738 | 5/1991 | Weilbach et al. | 310/90.5 |
| 5,031,061 | 7/1991 | Hatch | 360/99.08 |
| 5,112,142 | 5/1992 | Titcomb et al. | 384/132 |
| 5,173,797 | 12/1992 | Zedekar et al. | 384/110 |
| 5,200,866 | 4/1993 | Frugé et al. | 360/99.08 |
| 5,323,076 | 6/1994 | Hajec | 310/90 |

FOREIGN PATENT DOCUMENTS

| | | |
|---|---|---|
| 2627313 | 8/1989 | France . |
| 2645316 | 10/1990 | France . |
| 3818346 | 12/1988 | Germany . |
| 57-037116 | 3/1982 | Japan . |
| 1-120418 | 5/1989 | Japan . |
| WO9009051 | 8/1990 | WIPO . |

OTHER PUBLICATIONS

IEEE Transaction on Magnetics. vol. 23, No. 5, pp. 3687-3689, Sep. 1987, New York, US, Bouchard et al.; "An Investigation of Non-Repeatable Spindle Runout".

*Primary Examiner*—Clayton E. LaBalle
*Attorney, Agent, or Firm*—David B. Harrison

[57] ABSTRACT

A spindle and hub assembly in a disk drive having an integrated motor including a housing having a cylindrical sleeve and two end flanges, the cylindrical sleeve and the upper end flange being one piece and forming the hub and the lower end flange being pressed into the hub and a shaft being rotatably supported in the end flanges by means of hydrodynamic bearings, where the hydrodynamic bearings have conical bearing surfaces converging towards the interior of the housing, whereby a high precision and low cost spindle and hub assembly is provided.

20 Claims, 1 Drawing Sheet

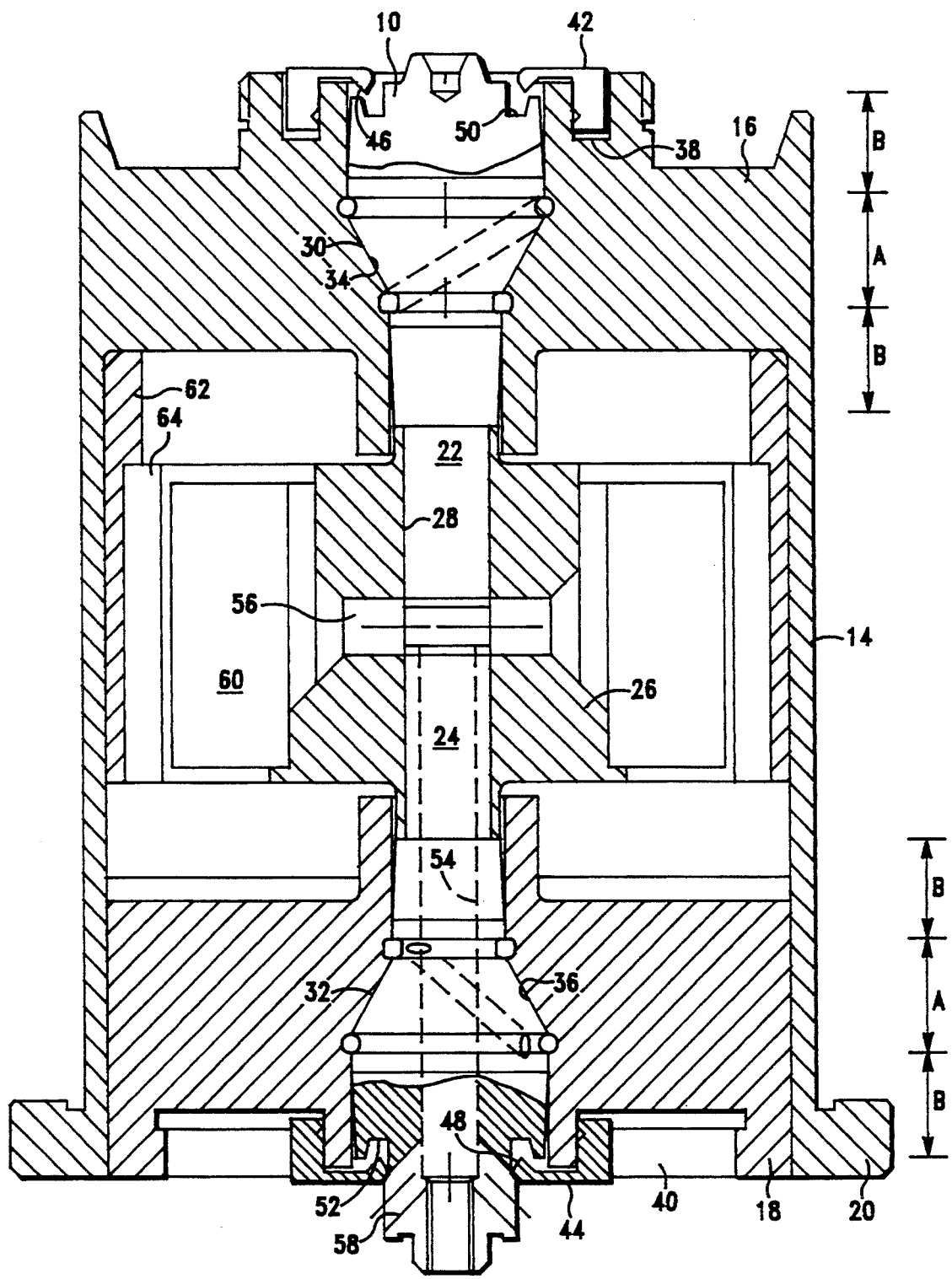

INTEGRATED HYDRODYNAMIC BEARING/MOTOR ASSEMBLY

This application is a continuation of application Ser. No. 07/976,238, filed Nov. 13, 1992 now abandoned.

BACKGROUND OF THE INVENTION

This invention relates to a spindle and hub assembly and more specifically to a spindle and hub assembly with an integrated motor for use in a disk drive.

Such integrated assemblies including spindle, hub, bearing and motor are commonly used in connection with magnetic or optical disk drives.

There are several kinds of integrated spindle and hub assemblies currently available on the market. One known assembly uses a bearing system with high precision ball bearings fitted into a hub, with the motor located in between the top and bottom bearings.

Due to increasing bit density required for disk drives, the precision required of spindle bearing assemblies for disk drives is constantly increasing. Ball bearings have the disadvantage of running with a very thin film of lubricant (in the order of 0.1–0.2 micrometers) between the balls and the bearing races while under operation. This very thin film causes extremely high pressures, and results in a lubricant film stiffness almost as high as the stiffness of the metal balls themselves. Surface imperfections on the balls limit the precision (normally measured in terms of "non-repeatable bearing runout") of the spindle since the ball and bearing race surfaces can more easily follow each others surface imperfections under operation.

Another known integrated spindle and hub assembly uses a journal-type hydrodynamic bearing with upper and lower thrust bearing, mounted into a hub. The hydrodynamic bearing is provided in the middle between the two thrust bearings. It requires a special ferrofluidic liquid responsive to a remote magnetic field, and has several disadvantages.

Due to the journal design there are a high number of parts and a high number of precision contact/mating surfaces which increase cost and can decrease yield. The journal design cannot compensate for variability of bearing stiffness with varying temperature. The hub forming the housing of this assembly is bell-shaped so that no symmetric design is attained. A further disadvantage is that the hub wall must be made very thin to accommodate the motor, thus increasing noise and vibrational problems. It is also difficult to seal the motor effectively with this configuration.

It is a primary objective of the invention to provide a high precision spindle and hub assembly for a disk drive which avoids the foregoing and other problems of known spindle and hub assemblies and which can be produced at low cost.

SUMMARY OF THE INVENTION

In accordance with the present invention, a spindle and hub assembly for supporting a disk or a stack of disks in a disk drive having an integrated drive motor includes a housing having a substantially cylindrical sleeve and two end flanges arranged substantially at right angles to the cylinder axis of the sleeve. The assembly further includes a shaft arranged coaxially with the cylinder axis and rotatably supported in said end flanges by means of hydrodynamic bearings. The integrated drive motor is arranged within the housing coaxially with the cylinder axis. The integrated drive motor further has two subassemblies rotatably arranged relative to each other; one of the subassemblies being connected to the housing and the other subassembly being connected to the shaft.

BRIEF DESCRIPTION OF THE DRAWING

FIG. 1 shows an axial cross section, with the shaft partially cut away, of a spindle and hub assembly in accordance with the invention.

DETAILED DESCRIPTION OF THE PREFERRED EMBODIMENTS

As noted above, the invention is directed toward providing a high precision spindle and hub assembly for supporting a disk or a stack of disks in a disk drive apparatus having an integrated drive motor, while still allowing for low production costs.

A preferred embodiment of a spindle and hub assembly in accordance with the invention will now be described with reference to FIG. 1. FIG. 1, the only figure in the drawing, shows an axial cross section through the spindle and hub assembly with the shaft being only partially cut away. The spindle and hub assembly comprises a stationary shaft 10 having an axis 12 and further comprising a housing which is axially symmetrical to axis 12 and which is pivotably supported at shaft 10. The housing comprises a cylindrical sleeve 14, an upper end flange 16 arranged at a right angle to axis 12 and a lower end flange 18 arranged at a right angle to axis 12. The upper end flange 16 may be integrally formed in one piece with the cylindrical sleeve 14, and the component 14, 16 serves as a hub for mounting one or more disks in a disk drive (not shown in the drawing). At its lower end the cylindrical sleeve 14 comprises a ring 20 preferably being formed integrally in one part therewith and extending radially outwardly. The ring 20 serves as a supporting surface for the stack of disks mounted on the hub.

The shaft 10 comprises two shaft parts 22 and 24 being connected with each other by a shaft coupler part 26. The shaft coupler part 26 is formed substantially symmetrical to axis 12 and comprises an axial throughhole 28 into which the adjacent ends of shaft parts 22, 24 are inserted or pressed.

Shaft 10 being pivotably supported in end flanges 16 and 18 comprises an upper and lower conical bearing surface 30 and 32, respectively, converging towards the interior of the housing and cooperating with corresponding conical bearing surfaces 34, 36 provided in the end flanges 16, 18.

In the bearing surfaces, spiral groove patterns are formed and oil is filled in between the bearing surfaces 30, 34 and 32, 36 respectively, thereby forming hydrodynamic bearings pivotably supporting the housing 14, 16, 18 on the shaft 10. Such hydrodynamic bearings are generally known and it is sufficient in this context to refer to U.S. Pat. No. 4,043,612.

On both sides, i.e., outer (closer to the outer surface of the respective end flange) and inner (farther from the outer surface of the respective end flange), of the hydrodynamic bearings (areas A) capillary seals are arranged (areas B). In the areas of the capillary seals, the peripheral area of the shaft forms an angle of about two degrees with the inner surfaces of the respective bores in the end flanges 16, 18 as seen in the axial direction, causing the corresponding gap to broaden away from the hydrodynamic bearing. Such capillary seals are prior art and reference is made to U.S. Pat. No. 4,795,275. The capillary seals in the areas B prevent the oil in the hydrodynamic bearing from escaping due to the high surface tension.

On each of the outer surfaces of the end flanges 16, 18 and coaxially to axis 12 a circumferential groove 38, 40 is formed into which upper and lower end caps 42, 44, respectively, are inserted. The end caps 42, 44 extend from the respective groove in the direction of the axis 12 and cover the gap formed by the capillary seals between the shaft and housing. The end caps 42, 44 may be coated with a material with low surface energy, i.e., friction, preferably Teflon. Ring-shaped noses 46, 48 formed at the inner ends of the end caps are directed towards the interior of the housing. Ring-shaped grooves 50, 52 are provided at the end faces of shaft 10. The ring-shaped noses 46, 48 protrude into the ring-shaped grooves without touching them. Thus, an additional labyrinth seal is created which seals any secondary leaking that could occur inside the spindle.

The shaft part 24 of shaft 10 comprises an axially extending channel 54 ending in a through-hole 56 of the shaft coupler part 26. The through-hole 56 extends at a right angle to axis 12 and is connected with the interior of the housing. At the lower end of the shaft part 24 bores 58 connect the channel 54 with the exterior environment of the housing. Due to the hollow shaft part 24 the interior of the housing is ventilated, and further, it is possible to supply through this hollow shaft the necessary cables for an electrical motor which will be described thereafter.

In the interior of the housing 14, 16, 18 an electrical motor for driving the hub/housing is installed. The electrical motor comprises a motor stator 60 which is fixed coaxially at the shaft coupler part 26, a motor stator return ring 62 pressed into the interior of the hub and resting with its cylindrical outer surface against the cylindrical inner surface of the cylindrical sleeve 14, as well as magnets 64 fixed to the motor stator return ring 62.

The structure described above may be assembled as follows. The upper shaft part 22 is mounted into the hub 14, 16 and oil is filled into a determined volume between the upper shaft part and the hub in area A. Similarly, the lower shaft part 24 is mounted into the end flange 18 and oil is filled into a determined volume existing between the lower shaft part and the lower end flange in area A. The motor stator return ring 62 and the magnets 64 are installed into the hub 14, 16. The motor stator 60 and the shaft coupler part 26 are pressed onto the lower shaft part 24 on top of the lower end flange 18. The motor wires are fed down the hollow center of the lower shaft half 24 along through-hole 56, channel 24 and bores 58. Subsequently, the subassembly containing the lower end flange 18, the lower shaft part 24, the shaft coupler part 26 and the stator 60 are pressed into the upper subassembly containing the hub 14, 16, the stator return ring 62, the magnets 64 and the upper shaft part 22. The clearance of the bearing is adjusted by pressing the subassemblies together to a determined amount of clearance. Finally, the end caps 42, 44 are installed by pressing them into the grooves 50, 52.

With the assembly completed, the upper and lower shaft ends may be then fastened into a base plate and a cover (not shown) of the disk drive. Activating the spindle motor then causes the housing 14, 16, 18 including the hub 14, 16 to spin around the stationary shaft 10. The hub "lifts off" the shaft 10 due to hydrodynamic action of the hydrodynamic bearings and the overpressure occurring in the bearings creates the necessary stiffness required for the spindle.

In a preferred embodiment, the hydrodynamic bearings have conical bearing surfaces converging towards the interior of the housing, and the bearing surfaces of the housing are provided directly on the end flanges. With this design the housing acts both as a housing for the hydrodynamic bearing and as a hub, i.e., the structure on which the disks are mounted, and the conical bearing surfaces are coined into the end flanges. This significantly reduces the number of parts and precision mating of contacting surfaces normally required in such devices, and, thereby, greatly reduces cost. Further, this saves a significant amount of space and allows for the spindle motor to be easily located in the area between the upper and lower bearings.

Currently known hydrodynamic bearings generally use a thrust bearing providing axial force and a separate journal bearing providing radial force installed into a hub. The present invention uses conical bearing surfaces which generate forces perpendicular to the cone. This force vector can be split into a radial component and an axial component, providing the necessary stiffness for the spindle. The bearing groove patterns in the flanges as well as the conical shape of the bearing surfaces allow the bearing to be made with significantly less parts than the currently known design. Since less parts are needed there is less tolerance build up due to the decreased number of precision mating surfaces. Thus, the cost is reduced.

The bearing stiffness of the assembly is created from hydrodynamic film pressures. The thickness of these lubricant films is in the order of 8–10 micrometers, significantly greater than those in ball bearings as previously discussed. This allows the hydrodynamic bearing to be less sensitive to surface imperfections in the bearing area between the shaft and housing, thus, greatly decreasing the amount of non-repeatable-runout. The fluid film of the hydrodynamic bearing dampens resonant frequencies and noise generated by the spindle, causing the spindle to run acoustically quieter than ball bearing spindles. With the assembly of the invention an extremely high track density (TPI) for magnetic or optical recording with excellent damping and low excitation properties may be achieved.

Further, with the assembly of this invention, a symmetric design may be achieved, i.e., the center of gravity of the assembly occurs at the midpoint of the distance between the upper and the lower bearings. This reduces pure conical and mixed (translational and conical) vibrational modes, increasing the ease of track following and enabling a higher track density.

Since, according to this invention, the bearings are provided in the end flanges of the housing, there is a large distance between the bearings in opposite end flanges which increases the overall stiffness of each bearing.

In the preferred embodiment, the housing includes two housing portions interconnectable in an axial direction; a first housing portion comprising said cylindrical sleeve and one of said end flanges and a second housing portion comprising the other end flange. Both of the housing portions are each preferably one piece.

In a further preferred embodiment, the shaft may be split so that a first shaft part has one of said two hydrodynamic bearings, and a second shaft part has the other of said hydrodynamic bearings. A shaft coupler part may be provided for coupling the two shaft parts and is preferably formed such that the adjacent ends of said two shaft parts may be inserted or pressed into the shaft coupler part in an axial direction.

As is evident from above, the clearance of the bearing may be adjusted by pressing the subassemblies together to provide a predetermined amount of clearance. The bearing clearance is proportional to bearing stiffness by a cubic function. In current hydrodynamic spindles, manufacturing tolerances of the bearing dictate the variance of this gap. Since the gap is critical, very tight tolerances must be specified to control it. With the design of this invention the bearing gap can be measured and adjusted to a desired width while pressing the upper and lower shafts together. Since the gap can be adjusted during assembly, manufacturing tolerances can be much looser than with currently known arrangements. Thus, costs are reduced.

Since the bearing clearance is adjustable, it is also possible to adjust or "tune" bearing stiffness. This provides a large advantage during the disk drive development stage, because the ability to adjust bearing stiffness within a certain range allows adjustment of the vibrational frequencies (mode frequencies) of the spindle assembly. This is advantageous when, for example, an excitation frequency exists in the drive near or at the natural frequency of the spindle. In this case the stiffness of the spindle could be slightly altered in order to move it away from the excitation frequency, preventing the occurrence of high resonant amplitudes in the spindle.

In a particularly preferred embodiment of the invention, the housing and the shaft are made of different materials which compensate for bearing stiffness with varying operating temperature and viscosity of the bearing liquid. Preferably, the housing is made of bronze and the shaft is made of steel.

As mentioned above, bearing stiffness with hydrodynamic bearings is proportional to the cube of the operating bearing gap, or distance between the bearing housing and the shaft. This means that the bearing stiffness is very sensitive to changes in the nominal gap width. In addition, the viscosity of the lubricant changes significantly with varying operating temperature. Both of these effects can vary the hydrodynamic bearing stiffness during operation, thus, altering the frequencies and known modes of vibration of the spindle. It is difficult for the control system of the disk drive to compensate for varying resonant frequencies.

The invention enables compensation for both of these effects by choice of suitable materials and bearing geometry (bearing distance and cone angle). Compensation may be achieved by using materials with different thermal constants, i.e., temperature coefficients of expansion. With an increase in temperature the bearing gap decreases to compensate for the accompanying decrease in lubricant viscosity which would decrease stiffness. Thus, stiffness remains constant. With a decrease in temperature the bearing gap increases to compensate for the accompanying increase in lubricant viscosity which would increase stiffness. Thus, stiffness remains constant.

Using bronze for the housing and steel for the shaft, for example, provides the proper ratio of thermal constants to enable a gap compensation in combination with the geometry configuration that provides relatively constant bearing stiffness over varying temperature. It has been found that the variation of the stiffness with temperature for the novel design of the invention over an operating temperature range of 10–50 degrees Celsius is almost linear.

Preferably, the hydrodynamic bearings are sealed at their axial end portions by means of capillary seals. These capillary seals make use of the high surface tension of oil between materials like steel and bronze and seal lubricant inside of the hydrodynamic bearing area. Such a capillary seal is disclosed, e.g., in U.S. Pat. No. 4,795,275.

For the sake of safety additional creeping barrier end caps may be used, which are fixed at the outer sides of the end flanges and overlap the creeping barriers.

In a further preferred embodiment, a channel may be formed in the interior of the shaft which at one end opens to the interior of the housing and at the other end opens to the exterior environment of the housing. This allows the motor, arranged within the housing, to be vented to the outside via the hollow shaft. The channel further serves to lead the wires of the motor to the exterior of the spindle and hub assembly. The lower end flange seals the spindle motor inside of the hub, thus decreasing cleanliness requirements, because any escaping debris from the motor will be locked inside the hub and unable to reach the inside of the head-disk assembly. This greatly reduces the risk of contamination of the head-disk assembly.

Since the spindle and hub assembly of the present invention does not need any O-ring or glue joints, the assembly has the further advantage of being easily reworkable.

As will be appreciated from the foregoing, the invention is not limited to assemblies for use in disk drives nor to assemblies having an integrated motor. Another aspect of the invention is a spindle arrangement including a housing having a substantially cylindrical sleeve and two end flanges arranged substantially at right angles to the cylinder axis of the sleeve and a shaft arranged coaxially with the cylinder axis where the shaft is rotatably supported in the end flanges by means of hydrodynamic bearings which have conical bearing surfaces.

Such a spindle arrangement may be provided with the further features as mentioned above in order to afford for an arrangement with a high precision rotational axis.

While the foregoing has described preferred embodiments of the invention, it will be apparent to one of skill in the art that changes in these embodiments may be made without departing from the principles of the invention, the scope of which is defined by the appended claims.

What is claimed is:

1. A spindle and hub assembly for supporting a disk or a stack of disks in a disk drive having an integrated drive motor, said assembly comprising:

a housing including a substantially cylindrical sleeve and two end flanges arranged substantially at right angles to a rotational axis of said spindle;

a shaft arranged coaxially with said axis, said shaft being rotatably supported in said end flanges by means of hydrodynamic beatings; said hydrodynamic bearings having bearing fluid; said bearing fluid being held internally within said assembly; each one of said hydrodynamic bearings configured to have conical bearing surfaces which converge toward the interior of said housing defining a cone angle therebetween; each of said hydrodynamic bearings further defining a bearing gap between the conical bearing surfaces on the shaft and corresponding conical bearing surfaces on the supporting end flange;

said shaft comprising a first shaft part having one of said two hydrodynamic bearings and a second shaft part having the other one of said hydrodynamic bearings, said assembly further including a shaft coupler part into which ends of said two shaft pans ate inserted or pressed in an axial direction to set a predetermined bearing gap for each of said hydrodynamic bearings during assembly; and said motor being arranged within said housing coaxially with said rotational axis and including two subassemblies rotatably arranged relative to each other, a first subassembly being connected to said housing and a second subassembly being connected to said shaft.

2. The assembly according to claim 1, wherein each of said hydrodynamic bearings has an inner side and an outer side and wherein each side is sealed by a capillary seal and wherein said end flanges have outer surfaces and the assembly further includes end caps provided at said outer surfaces of said end flanges, said end caps overlapping the respective capillary seal on the outer side of said hydrodynamic bearing, said end caps being coated with a material having low surface energy to provide creeping barriers.

3. The assembly according to claim 1, wherein said housing includes two housing portions interconnectable in the direction of said axis and wherein a first housing portion comprises said cylindrical sleeve and one of said end flanges and a second housing portion comprises the other end flange.

4. The assembly according to claim 3, wherein the cylindrical sleeve and end flange of said first housing portion are integral.

5. The assembly according to claim 1, wherein a channel is formed in the interior of said shaft, said channel communicating at one end with the interior of said housing and at another end with the exterior environment of said housing.

6. The assembly according to claim 1, wherein said housing is made of bronze and said shaft is made of steel.

7. The assembly according to claim 1, wherein said shaft is stationary and said housing is adapted to rotate about said shaft.

8. A spindle apparatus, comprising:

a housing including a substantially cylindrical sleeve and two end flanges arranged substantially at fight angles to a spindle axis; and a shaft arranged coaxially with said spindle axis, said shaft being rotatably supported in said end flanges by means of hydrodynamic bearings having conical bearing surfaces which converge toward the interior of said housing, said hydrodynamic bearings having bearing fluid; said bearing fluid being held internally within said assembly; and wherein each of said hydrodynamic beings has an inner said and an outer side and wherein each side is sealed by a capillary seal, and wherein said end flanges have outer surfaces and the assembly further includes end caps provided at said outer surfaces of said end flanges, said end caps overlapping the respective capillary seal on the outer side of said hydrodynamic bearing, said end caps carrying a coating of a material having low surface energy to provide creeping barriers against bearing fluid flow exteriorly beyond said capillary seals on the outer side of each hydrodynamic bearing.

9. The spindle apparatus according to claim 8, wherein said housing includes two housing portions interconnectable in the direction of said axis and wherein a first housing portion comprises said cylindrical sleeve and one of said end flanges and a second housing portion comprises the other end flange.

10. The spindle apparatus according to claim 9, wherein the cylindrical sleeve and end flange of said first housing portion are integral.

11. The spindle apparatus according to claim 8, wherein said shaft comprises a first shaft part having one of said two hydrodynamic bearings and a second shaft part having the other one of said hydrodynamic bearings, and wherein said apparatus further includes means for connecting said two shaft parts.

12. The spindle apparatus according to claim 11, wherein said connecting means comprises a shaft coupler part into which the adjacent ends of said two shaft parts are inserted or pressed in an axial direction to provide a predetermined bearing gap and to provide for assembly.

13. The spindle apparatus according to claim 8, wherein each one of said hydrodynamic bearings is configured to have conical bearing surfaces which converge toward the interior of said housing defining a cone angle therebetween; each of said hydrodynamic bearings further defining a bearing gap between the conical bearing surfaces on the shaft and corresponding conical bearing surfaces on the supporting end flange; said housing and said shaft being made of different materials each having different temperature coefficients of expansion.

14. The spindle apparatus according to claim 13, wherein said shaft comprises a first shaft part having one of said two hydrodynamic bearings and a second shaft part having the other one of said hydrodynamic beatings, and wherein said apparatus further includes means for connecting said two shaft parts.

15. The spindle apparatus according to claim 14, wherein said connecting means comprises a shaft coupler part into which the adjacent ends of said two shaft parts are inserted or pressed in an axial direction to set a nominal bearing gap for each of said hydrodynamic bearings and to provide for assembly.

16. A spindle and hub assembly for supporting a disk or a stack of disks in a disk drive having an integrated drive motor, said assembly comprising:

a housing including a substantially cylindrical sleeve and two end flanges arranged substantially at fight angles to a central longitudinal axis of said substantially cylindrical sleeve;

a shaft arranged coaxially with said central longitudinal axis, said shaft being rotatably supported in said end flanges by means of hydrodynamic bearings; said hydrodynamic bearings having bearing fluid; said bearing fluid being held internally within said assembly; each of said hydrodynamic bearings having an inner side and an outer side; each of said inner sides and said outer sides being sealed by a capillary seal; said end flanges having outer surfaces and the assembly further including end caps provided at said outer surfaces of said end flanges, said end caps overlapping the respective capillary seal on the outer side of said hydrodynamic bearing, said end caps being coated with a material having low surface energy to provide creeping barriers; and said motor being arranged within said housing coaxially with said axis and including two subassemblies rotatably arranged relative to each other, a first subassembly being connected to said housing and a second subassembly being connected to said shaft.

17. A spindle and hub assembly for supporting a disk or a stack of disks in a disk drive having an integrated drive motor, said assembly comprising:

a housing including a substantially cylindrical sleeve and two end flanges arranged substantially at right angles to a cylindrical axis of said sleeve, a shaft arranged coaxially with said axis, said shaft being rotatably supported in said end flanges by means of hydrodynamic bearings; said hydrodynamic bearings having bearing fluid; said bearing fluid being held internally within said assembly; said shaft comprising a first part having one of said two hydrodynamic beatings and a second shaft part having the other one of said hydrodynamic bearings; said assembly having a shaft coupler pan into which the adjacent ends of said two shaft parts are inserted or pressed in an axial direction to provide a predetermined bearing gap and to provide for assembly; and said motor being arranged within said housing coaxially with said axis and including two subassemblies rotatably arranged relative to each other, a first subassembly being connected to said housing and a second subassembly being connected to said shaft.

18. A spindle apparatus, comprising:

a housing including a substantially cylindrical sleeve and two end flanges arranged substantially at right angles to an axis of the sleeve; and a shaft arranged coaxially with said axis, said shaft being rotatably supported in said end flanges by means of hydrodynamic bearings having conical bearing surfaces which converge toward the interior of said housing; said hydrodynamic bearings having bearing fluid; said bearing fluid being held internally within said assembly; each of said hydrodynamic bearings having an inner side and an outer side; each of said inner sides and said outer sides being sealed by a capillary seal; said end flanges having outer surfaces and the assembly further including end caps provided at said outer surfaces of said end flanges, said end caps overlapping the respective capillary seal on the outer side of said hydrodynamic bearing, said end caps being coated with a material having low surface energy to provide creeping barriers.

19. A spindle apparatus, comprising:

a housing including a substantially cylindrical sleeve and two end flanges arranged substantially at right angles to an axis of the sleeve; and a shaft arranged coaxially with said axis, said shaft being rotatably supported in said end flanges by means of hydrodynamic bearings having conical bearing surfaces which converge toward the interior of said housing; said hydrodynamic bearings having bearing fluid; said bearing fluid being held internally within said assembly; said shaft comprising a first shaft part having one of said two hydrodynamic bearings and a second shaft part having the other one of said hydrodynamic bearings; said assembly having a shaft coupler part into which the adjacent ends of said two shaft pans are inserted or pressed in an axial direction to provide a predetermined bearing gap and to provide for assembly.

20. A spindle and hub assembly for supporting a disk or a stack of disks in a disk drive having an integrated drive motor, said assembly comprising:

a housing including a substantially cylindrical sleeve and two end flanges arranged substantially at right angles to a rotational axis of said spindle;

a shaft arranged coaxially with said axis, said shaft being rotatably supported in said end flanges by means of hydrodynamic bearings; said hydrodynamic bearings having beating fluid; said bearing fluid being held internally within said assembly; each one of said hydrodynamic bearings configured to have conical bearing surfaces which converge toward the interior of said housing defining a cone angle therebetween; each of said hydrodynamic bearings further defining a bearing gap between the conical bearing surfaces on the shaft and corresponding conical bearing surfaces on the supporting end flange;

said shaft comprising a first shaft part having one of said two hydrodynamic bearings and a second shaft part having the other one of said hydrodynamic bearings, said assembly further including a shaft coupler part into which ends of said two shaft parts are inserted or pressed in an axial direction to set a predetermined bearing gap for each of said hydrodynamic bearings during assembly;

each of the hydrodynamic bearings having an inner side and an outer side and wherein each side is sealed by a capillary seal and wherein said end flanges have outer surfaces, the assembly including end caps provided at said outer surfaces of said end flanges, said end caps overlapping the respective capillary seal on the outer side of said hydrodynamic bearing, said end caps being coated with a material having low surface energy to provide bearing fluid creeping barriers; and, said motor being arranged within said housing coaxially with said rotational axis and including two subassemblies rotatably arranged relative to each other, a first subassembly being connected to said housing and a second subassembly being connected to said shaft.

* * * * *